Patented Mar. 16, 1948

2,437,984

UNITED STATES PATENT OFFICE 2,437,984

PROCESS FOR THE PREPARATION OF GAMMA-DIBUTYLAMINOPROPANOL

Arthur W. Weston, Waukegan, Ill., assignor to Abbott Laboratories, North Chicago, Ill., a corporation of Illinois No Drawing. Application August 9, 1945, Serial No. 609,921

2 Claims. (Cl. 260—584)

This invention relates to a new and improved process for preparing the compound gamma-dibutylaminopropanol which may be used to prepare gamma-di-n-butylaminopropyl p-aminobenzoate having the formula

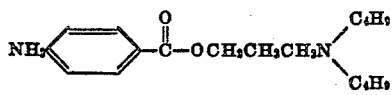

The complete process consists of first condensing dibutylamine with allyl alcohol in the presence of a catalyst to produce gamma-dibutylaminopropyl alcohol, then esterifying this alcohol to form gamma-dibutylaminopropyl para-nitrobenzoate, and finally reducing the nitro compound to gamma-dibutylaminopropyl para-aminobenzoate.

According to the invention, 23 g. (g.=grams) of metallic sodium is added portionwise to 174 g. of allyl alcohol. Toward the end of the addition, it is usually necessary to heat the mixture on the steam bath in order to dissolve all the sodium. 130 g. of dibutylamine is then added and the resulting solution maintained at 85° C. for 75 hours. The excess allyl alcohol is recovered by distillation at reduced pressure. The residual oil is washed with water then acidified with hydrochloric acid. This amine hydrochloride layer is washed with benzene, then made alkaline with 50% aqueous sodium hydroxide. The regenerated base is extracted with ether. The ether extracts are dried and concentrated leaving the crude gamma-dibutylaminopropanol as an oil. This can be purified by distillation. The aminoalcohol has boiling point 115–116° C. at 8 mm. and $n_d^{25}$, 1.4460. The yield is 79–85% of the theoretical amount. The sodium may be replaced by other alkali metals.

The gamma-dibutylaminopropyl alcohol may be esterified with para-nitrobenzoyl chloride and the resulting nitro compound reduced to the desired gamma - dibutylaminopropyl - para-aminobenzoate in accordance with standard practices in the art.

Without further elaboration, the foregoing will fully explain my invention that others may readily adapt the same for use under various conditions of service.

I claim:

1. The process of preparing the compound gamma-dibutylaminopropanol which consists of combining allyl alcohol with dibutylamine in the presence of a catalyst, selected from the group alkali metals.

2. The process of preparing the compound gamma-dibutylaminopropanol which consists of combining allyl alcohol with dibutylamine in the presence of sodium.

ARTHUR W. WESTON.

REFERENCES CITED

The following references are of record in the file of this patent:

UNITED STATES PATENTS

| Number | Name | Date |
|---|---|---|
| 1,358,751 | Kamm et al. | Nov. 16, 1920 |
| 1,676,470 | Adams et al. | July 10, 1928 |

FOREIGN PATENTS

| Number | Country | Date |
|---|---|---|
| 496,280 | Germany | Apr. 15, 1930 |
| 528,466 | Germany | July 1, 1931 |